United States Patent [19]
Brown

[11] 3,811,348
[45] May 21, 1974

[54] SURVEYING APPARATUS WITH CUTTER
[76] Inventor: Robert L. Brown, 881 George Washington Hwy. Lot 28, Chesapeake, Va. 23323
[22] Filed: June 5, 1973
[21] Appl. No.: 367,187

[52] U.S. Cl............ 83/13, 83/522, 83/580, 83/581, 83/588, 83/639, 83/701
[51] Int. Cl............................................ B26d 5/12
[58] Field of Search....... 83/13, 522, 639, 701, 580, 83/581, 588; 30/180, 210

[56] References Cited
UNITED STATES PATENTS
3,438,129   4/1969   Spangler.......................... 83/580 X Primary Examiner—Frank T. Yost
Attorney, Agent, or Firm—Nathaniel A. Humphries, Esq.

[57] ABSTRACT

An apparatus and method of providing surveyor stakes having a top end termination indicative of a desired elevation is disclosed comprising a hydraulic cylinder connected to a cutting blade supported on the lower end of a levelling rod movable adjacent a surveyor's stake while being monitored through a transit with the hydraulic cutting means being actuated by a manual hydraulic pump carried by the user when the blade is observed to be positioned at a desired elevation to cut the top of the stake and provide a resultant stake having a top end termination of the desired elevation.

12 Claims, 5 Drawing Figures

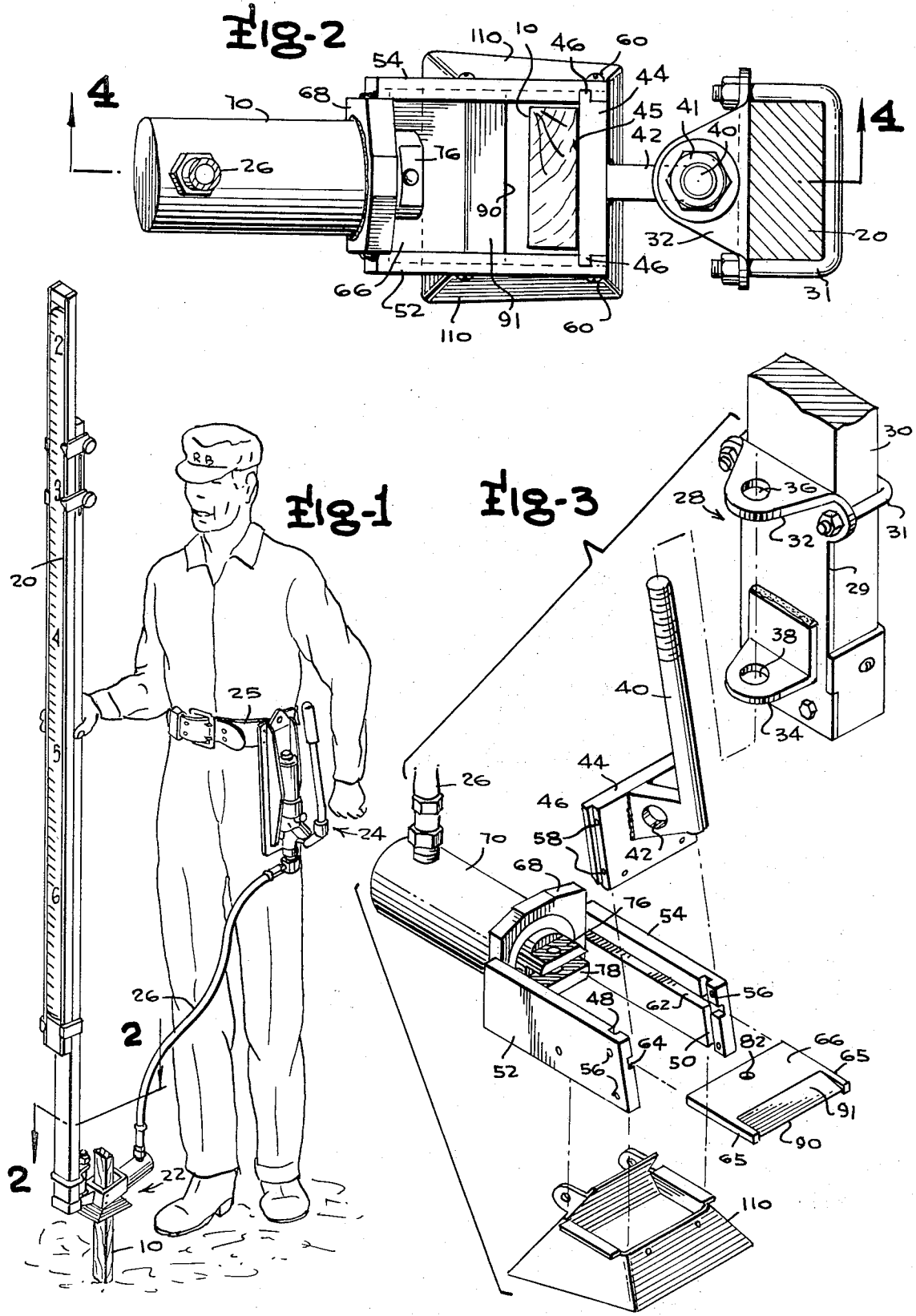

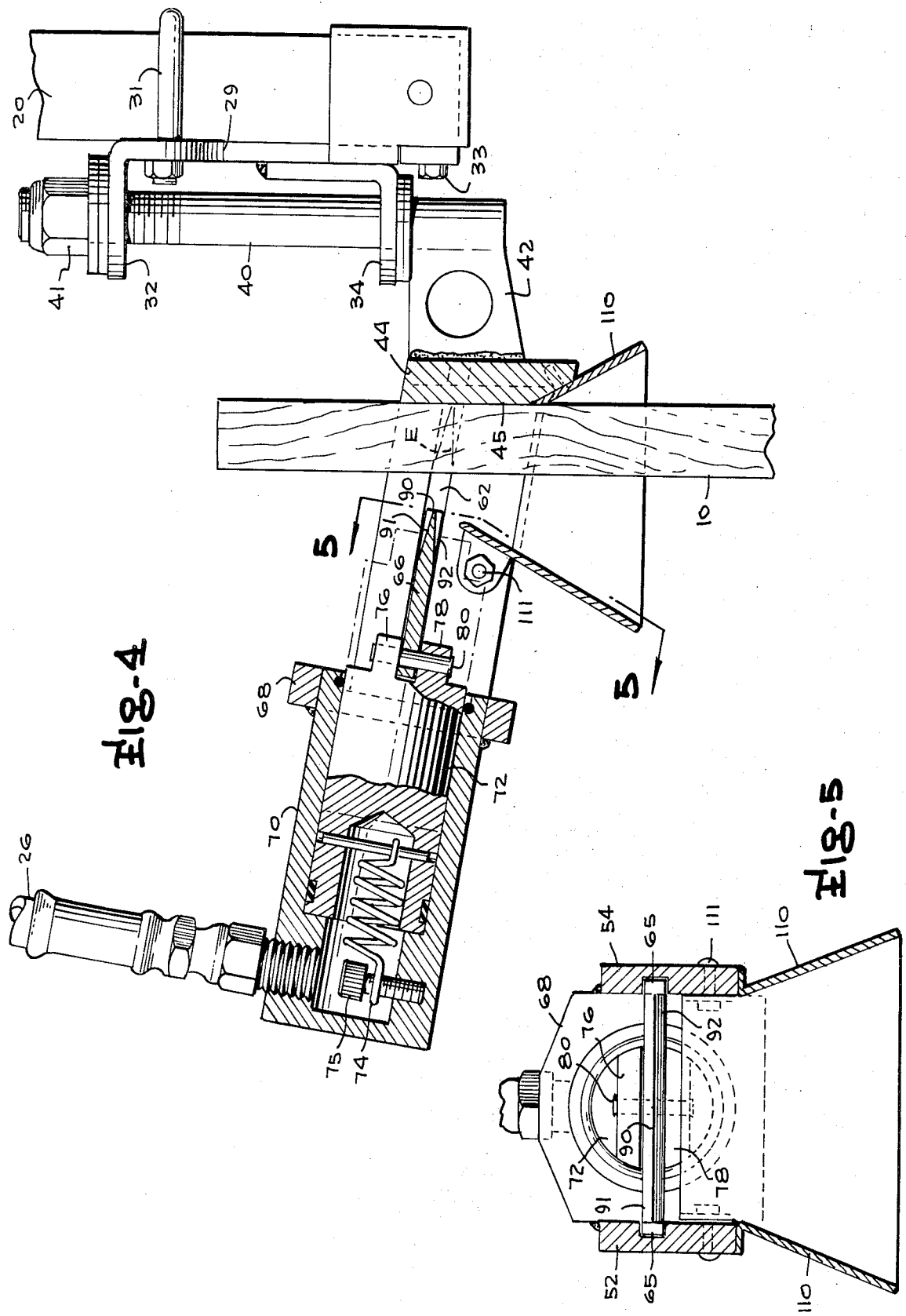

SURVEYING APPARATUS WITH CUTTER

This invention is in the field of surveying equipment and is more specifically directed to surveying equipment for providing a surveyor's stake indicative of a desired elevation.

It has been the practice for surveyors to drive stakes into the ground while interrupting the stake driving operation to make intermittent checks on the elevation of the top of the stake by use of a transit and levelling rod engaged with the top of the stake so that the top of the stake will be driven downwardly until the desired level is reached. Unfortunately, the foregoing process, while remaining the best known approach for providing stakes indicative of elevation, has suffered from a number of drawbacks; for example, it frequently occurs that a stake is driven too far into the ground with its top end surface being below the desired elevation and it is then necessary to extract the stake and redrive it in an effort to properly position the top end surface of the stake. Moreover, the manual driving and elevation checking of the stake is a time consuming operation which increases the total cost of the surveying procedure.

Another problem frequently encountered with the prior practice of driving stakes while making intermittent elevation checks on the particular stake being driven arises from the fact that the stakes are frequently of relatively short length which results in only a short segment at the lower end of the stake being embedded in the earth at the time that the top end of the stake is positioned at the desired elevation. Such stakes are easily knocked over or otherwise accidentally mispositioned and must consequently be repositioned to the consequent inconvenience and extra cost to the surveyor.

Another frequently encountered problem with the prior known approach to providing surveyor's stakes having their tops at desired elevations is that the stakes are often pulled from the earth by small children or vandals. It is usually a relatively easy matter to pull the smooth-surfaced wooden stakes that are shallowly embedded in the soil from the soil and they consequently represent an easily fulfilled temptation to children and others. Consequently, it is frequently necessary to replace stakes that have been accidentally or deliberately removed or tampered with to the consequent additional work, delay and expense to the surveyor.

One approach to a solution of the foregoing problems has been to provide markings on the sides of a surveyor's stake indicative of the desired elevation. Such stakes obviously do not have to be driven with the precision necessary for achieving a desired top end positioning required of the most frequently employed surveying approach as discussed above. However, the marking of stakes with visual elevation indicators is time consuming and is frequently unsatisfactory since the stakes eventually become coated with dust or the like rendering the marking difficult, if not impossible, to see. Moreover, markings must be applied to all sides of the stake in order to be visible from any angle as is the top of the stake. Therefore, the provision of stakes having their top end termination indicative of the desired elevation remains superior to the employment of stakes having marks or the like on their outer surfaces.

Another approach to the solution of the aforementioned problems is that illustrated in U.S. Pat. No. 3,437,156 in which a metal spiral auger is employed as a stake with an electric motor serving to implant the auger into the earth downwardly to a desired elevation. The patent device will not work in soil containing rocks, roots or the like which would stop downward movement of the spiral auger. Also, the patent requires the employment of a portable battery and a rather complicated structure of substantial cost. Not only is the apparatus itself costly, the spiral metal stakes are much more costly (and also represent a greater temptation to thieves) than the commonly employed wooden stakes and employment of the apparatus of this patent is consequently relatively expensive.

Therefore, it is the object of this invention to provide a new and improved method and apparatus for providing survey stakes having their tops at desired elevation levels.

A further object of this invention is the provision of a new and improved apparatus for providing survey stakes having their tops at a desired elevation.

Achievement of the objects of this invention is enabled through the provision of a hydraulically operated cutting means positionable over a vertically extending stake driven into the ground at sufficient distance to be firmly implanted and not easily removed. The vertically positionable cutting means is mounted on the lower end of a levelling rod so as to be movable upwardly and downwardly adjacent the stake surface. The levelling rod elevation is easily monitored in a conventional manner through the use of a transit and, upon the rod arriving at a desired elevation, the cutting means is then actuated while the levelling rod is maintained at the desired elevation for the purpose of severing the stake to provide a resultant stake firmly embedded in the earth and having its top surface at the desired elevation.

The cutting means comprises a hydraulic piston and cylinder to which a cutting blade is mounted with the cutting blade being guided by slotted guide plates for linear forward movement toward the stake to be severed. The rear side of the stake is engaged by a backup plate connected to the forward ends of the guide plates for preventing movement of the stake away from the blade as the blade is forced through the body of the stake.

A flexible hose extends from the hydraulic cylinder to a hydraulic pump carried by the user of the device on a harness or belt so that the user can manipulate the levelling rod and hold the levelling rod at the desired elevation from any position within the limits of the length of the hydraulic hose while actuating the hydraulic pump. Moreover, the cutting means is pivotally connected to the lower end of the levelling rod by a pivotal support bracket so that the levelling rod can be oriented about its vertical axis to face the transit regardless of the direction of the transit from the stake while the cutting means remains in proper position engageable with the stake to be severed.

A better understanding of the manner in which the preferred embodiment of the invention achieves the foregoing objects will be enabled when the following written description is read in conjunction with the appended drawings in which:

FIG. 1 is a perspective view illustrating the manner in which a user of the preferred embodiment employs the device;

FIG. 2 is a sectional view taken along lines 2—2 of FIG. 1;

FIG. 3 is an exploded perspective view of a portion of the preferred embodiment;

FIG. 4 is a sectional view taken along lines 4—4 of FIG. 2; and

FIG. 5 is a sectional view taken along lines 5—5 of FIG. 4.

Turning first to FIG. 1, the preferred embodiment comprises a conventional levelling rod 20 having indicia on its face and to the lower end of which a cutting means, generally designated 22, is fixedly connected. A power source in the form of a manually operable hydraulic pump 24 carried on a belt 25 of the user is connected to the cutting means 22 by a flexible hydraulic hose 26.

A supporting bracket 28 including a base plate 29 is connected to the lower end 30 of the levelling rod 20 by means 31, 33 etc. and includes first and second pivot support lugs 32 and 34 having aligned apertures 36 and 38 respectively through which a pivot pin 40 having an axis parallel to the axis of rod 20 extends.

The lower end of pivot pim 40 is provided with a radially extending arm 42 to the outer end of which a backup plate 44 is welded or otherwise fixedly connected. Backup plate 44 includes an inwardly facing stake engaging surface 45 and is provided with end guide lugs 46 on each end which are received in slots 48 and 50 respectively provided on the inwardly facing surfaces of first and second blade guide plates 52 and 54. Additionally, apertures 56 are provided in the ends of the blade guide plates 52 and 54 to communicate with tapped openings 58 in each side edge of the backup plate 44 with threaded retaining elements 60 extending through the openings 56, 58 to maintain the backup plate in fixed position on the outer ends of the first and second guide plates 52 and 54.

Pivot pin 40 is held in fixed position by the tightening of threaded nut means 41 threadably received on the upper end of the pivot pin 40 so that the rotative positioning of the pivot pin 40 about its axis with respect to the levelling rod 20 can be easily accomplished. Consequently, the backup plate 44 is capable of orientation at any desired rotative angle with respect to the levelling rod to enable the indicia on rod 20 to always face the surveying instrument with which the apparatus is being used.

Blade guide plates 52 and 54 additionally respectively include blade guide slots 62 and 64 which face inwardly and in which the guide slide edges 65 of a movable cutting blade 66 are positioned for movement toward and away from the backup plate 44. The rearmost ends of the blade guide plates 52 and 54 are welded or otherwise fixedly connected to the side edges of a main frame shoulder plate 68 which is apertured to provide support for a hydraulic cylinder 70 welded to its outer surface.

A power piston 72 is positioned on the interior of the hydraulic cylinder 70 with a coil spring 74 extending between the piston 72 and a threaded lug abutment means 75 for biassing the piston 72 inwardly to the left as shown in FIG. 4. The outer end of the piston 72 comprises first and second blade retaining lugs 76 and 78 extending unitarily from the main piston body. A blade retaining pin 80 extends through apertures in the blade retaining lugs 76 and 78 and a blade aperture 82 for providing a fixed drive connection between the piston and the blade 66 by means of retaining pin 80.

Turning now to FIG. 4 of the drawings, it is of substantial importance to note that the cutting blade 66 includes a sharp forward edge 90 formed at the apex of tapered surfaces 91 and 92 of equal dimension so that the sharp forward edge 90 is positioned in a plane medially of the fixed body portion of the blade member 66 as will be obvious from inspection of the drawings. Surface 45 of backup plate 44 is canted at an acute angle with respect to guide slots 62 and 64 so that canted orientation of the blade 66 effectively positions the lower surface 92 in substantially perpendicular orientation to the stake 10 whereby forward movement of the blade 66 through the stake effects a cut along a surface E that is perpendicular to the sides of the stake and is essentially in a horizontal plane.

Flexible hydraulic hose 26 is connected to the ends of cylinder 70 as shown in FIG. 4 so that actuation of the conventional hydraulic pump power source 24 provides pressurized hydraulic fluid to act upon piston 72 to consequently move blade 66 to the right as viewed in FIG. 4 to effect a cutting operation along surface E of stake 10. Backup plate 44 provides resistance to the forward cutting movement of the blade 66 in an obvious manner. Power source 24 includes a pressure release valve for permitting spring 74 to return piston 72 to its retracted position illustrated in FIG. 4 upon completion of the cutting operation.

An inverted flairing guide member 110 is connected to the side guide plates 52 and 54 by connector 111 and permits the easy insertion of the top end of a stake 10 upwardly through a stake receiving opening defined by the cutting edge 90, the inwardly facing sides of the guide plates 52 and 54 and the inwardly facing surface 45 of the backup plate 44.

In use, the levelling rod 20 and the associated cutting means 22 etc. is moved upwardly and downwardly by the user while being monitored by a helper through use of a transit or the like. When the levelling rod 20 reaches a desired level, the user of the device then actuates the hydraulic pump means 24 etc. to cause blade 66 to sever the stake along surface E which is at the exact desired elevation for the top of the particular stake 10. It will be apparent that the provision of an elevation stake by the foregoing operation is much more quickly effected than is possible with the prior approach of driving and intermittently checking the elevation of a particular stake until such time as the top end of the stake is properly positioned. Moreover, the subject invention enables the stakes to initially be driven to a substantial depth in order that a stake cannot be easily removed by unauthorized persons.

Therefore, it should be appreciated that the subject invention enables a much more rapid provision of stakes having their top surfaces at a desired elevation while also providing stakes that are not as easily tampered with and/or accidentally moved.

Numerous modifications of the subject invention such as, for example, the employment of electrical or mechanical type stake cutting means will undoubtedly occur to those of skill in the art; however, it should be understood that the spirit and scope of the invention is to be limited solely by the appended claims.

What is claimed is:

1. An apparatus for providing a vertically oriented stake having a top end termination at a desired elevation, said apparatus comprising a vertically movable support member, cutting means capable of severing a stake, said cutting means being mounted on said support member for vertical movement adjacent a stake having a top end termination above said desired elevation and indicator means on said support member indicative of the elevation of the cutting means so that actuation of said cutting means can be effected when the cutting means is at said desired elevation to provide a stake having a top end termination at said desired elevation.

2. The invention of claim 1 wherein said support means comprises a levelling rod.

3. The invention of claim 1 wherein said support means comprises a levelling rod and additionally including hydraulic power means connected to said cutting means for actuating said cutting means.

4. The invention of claim 1 wherein said support means comprises a levelling rod and further including hydraulic power means connected to said cutting means for actuating said cutting means and bracket means connecting said cutting means to the lower end of said levelling rod.

5. The invention of claim 1 wherein said support means comprises a levelling rod and said cutting means comprises a movable blade, guide means supporting said movable blade for linear path of movement, hydraulic power means connected to said movable blade moving said movable blade along said linear path of movement, bracket means connectingly supporting said movable blade, said guide means and said hydraulic power means to the lower end of said levelling rod and backup means engageable with a side of said stake opposite said blade for preventing movement of said stake by engagement of said blade with the stake.

6. The invention of claim 5 additionally including a manually operable hydraulic pump carried by the user of the apparatus and hydraulic hose means connecting said hydraulic pump to said hydraulic power means whereby the user of the apparatus can actuate said hydraulic power means from various positions limited by the length of said hydraulic hose means.

7. The invention of claim 5 wherein said guide means comprises first and second parallel guide plates, a shoulder plate connecting one end of said guide plates, said guide plates having inwardly facing surfaces in which parallel aligned guide slots extend, said cutting blade comprises a rectangular blade member having ends received in said guide slots, and said hydraulic power means comprises a hydraulic cylinder mounted on said shoulder plate and having an internal piston connected to said cutting blade.

8. The invention of claim 7 wherein said bracket means includes a pivot pin having an axis extending substantially parallel to the axis of said levelling rod and a radial arm means extending from the lower end of said pivot pin and having an outer end termination to an external surface of said backup means.

9. The invention of claim 8 wherein said backup means comprises a backup plate fixedly connected to the ends of said guide plates opposite the ends of said guide plates connected to said shoulder plate whereby a stake receiving opening is defined by inwardly facing surfaces of said guide plates and said backup plate in conjunction with a cutting edge of said cutting blade in which stake receiving opening receiving said stake is received prior to the cutting thereof.

10. The invention of claim 8 wherein said guide slots are oriented at an acute angle with respect to the inwardly facing surface of said backup plate and said cutting blade includes a forward cutting edge positioned medially of the thickness of said blade.

11. A method of providing a vertically positioned survey stake with a top end termination at a desired elevation, said method comprising the steps of moving a selectively actuable cutting means adjacent a vertically extending stake having a top end termination above the desired elevation, monitoring movement of the selectively actuable cutting means and terminating the vertical movement of the selectively actuable cutting means when said selectively actuable cutting means arrives at said desired elevation and actuating said selectively actuable cutting means at said desired elevation to provide a survey stake having a top end termination at said desired elevation.

12. The method of claim 11 wherein the elevation of said selectively actuable cutting means is monitored by visual inspection through a transit of a levelling rod to which the selectively actuable cutting means is supportingly attached.

* * * * *